(12) United States Patent
Simmons

(10) Patent No.: US 8,161,707 B2
(45) Date of Patent: Apr. 24, 2012

(54) BUILDING FRAME STRUCTURE

(75) Inventor: Robert J. Simmons, Hayward, CA (US)

(73) Assignee: ConXtech, Inc., Hayward, CA (US)

( * ) Notice: Subject to any disclaimer, the term of this patent is extended or adjusted under 35 U.S.C. 154(b) by 0 days.

(21) Appl. No.: 12/080,898

(22) Filed: Apr. 7, 2008

(65) Prior Publication Data

US 2008/0245023 A1    Oct. 9, 2008

Related U.S. Application Data

(60) Division of application No. 11/655,516, filed on Jan. 18, 2007, which is a division of application No. 10/961,886, filed on Oct. 9, 2004, now abandoned, which is a continuation of application No. 10/102,404, filed on Mar. 18, 2002, now Pat. No. 6,802,169.

(51) Int. Cl.
*E04H 12/00* (2006.01)

(52) U.S. Cl. ............... 52/648.1; 52/653.1; 52/655.1; 403/170; 403/187; 403/230; 403/252

(58) Field of Classification Search ............ 52/648.1, 52/653.1, 654.1, 655, 651.1, 655.1; 403/169, 403/170, 230, 231, 187, 188, 240, 403, 382, 403/384, 252; 182/179.1, 186.1
See application file for complete search history.

(56) References Cited

U.S. PATENT DOCUMENTS

| | | | | |
|---|---|---|---|---|
| 1,090,955 A * | 3/1914 | Yorke | ........................... | 403/170 |
| 1,258,409 A * | 3/1918 | Hill | ............................. | 52/648.1 |
| 1,729,743 A * | 10/1929 | Jorgensen et al. | ........... | 52/648.1 |
| 2,106,084 A * | 1/1938 | Coddington | ..................... | 52/376 |
| 2,155,709 A * | 4/1939 | Patterson | ........................ | 52/262 |
| 2,723,107 A * | 11/1955 | Parker | ............................ | 256/24 |
| 2,744,590 A * | 5/1956 | Butts | .............................. | 52/645 |
| 2,872,750 A * | 2/1959 | Holcomb | ........................ | 40/610 |

(Continued)

FOREIGN PATENT DOCUMENTS

FR    2471461 A  *  6/1981

OTHER PUBLICATIONS

Selection (pp. 2-10) from Jun. 9, 2009 Office Action in companion U.S. Appl. No. 11/655,516 containing Examiner's comments in relation to these two references.

*Primary Examiner* — Robert Canfield
*Assistant Examiner* — Jessie Fonseca
(74) *Attorney, Agent, or Firm* — Jon M. Dickinson, Esq.; Robert D. Varitz, Esq.

(57) ABSTRACT

A family of beam cross-connections, including column/beam and beam/beam connections, between beams and columns in a building frame. Each connection within a cross-connection features (a) a pair of parallel-spaced, upright, planar plate components operatively associated with either a side of a column or a side of a beam, (b) an elongate, generally horizontal cross-connection beam including a generally upright, planar central web with an end which, with respect to a pair of such plate components, extends into the space that exists between those components, and (c) a structural relationship involving the plate components in a pair which accommodates (1) vertical-motion placement of a web end between the components, with (2) the automatic establishment thereby of correct relative, spatial, three-dimensional relationships and dispositions of the specific, associated column and/or beam elements so connected.

3 Claims, 5 Drawing Sheets

U.S. PATENT DOCUMENTS

| | | | | |
|---|---|---|---|---|
| 3,085,148 | A * | 4/1963 | McConnell | 219/139 |
| 3,706,169 | A * | 12/1972 | Rensch | 52/263 |
| 3,977,801 | A * | 8/1976 | Murphy | 248/188 |
| 3,989,399 | A * | 11/1976 | Slowbe | 403/245 |
| 4,068,398 | A * | 1/1978 | Parisi | 40/607.02 |
| 4,382,710 | A * | 5/1983 | Slowbe | 403/252 |
| 4,398,841 | A * | 8/1983 | Kojima et al. | 403/173 |
| 5,180,068 | A * | 1/1993 | Vargo | 211/191 |
| 5,904,025 | A * | 5/1999 | Bass et al. | 52/741.3 |
| 5,964,072 | A * | 10/1999 | Rasmussen | 52/666 |
| 6,138,427 | A * | 10/2000 | Houghton | 52/655.1 |
| 6,272,796 | B1 * | 8/2001 | Metzler | 52/93.1 |
| 6,591,573 | B2 * | 7/2003 | Houghton | 52/656.9 |

\* cited by examiner

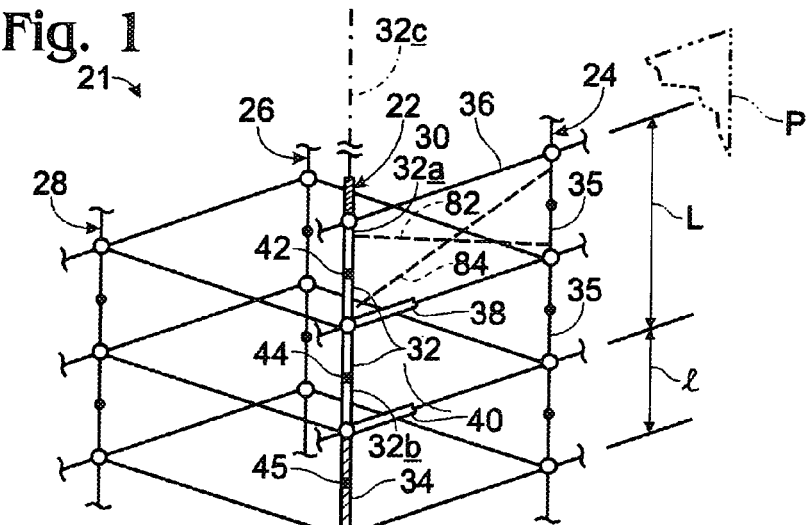

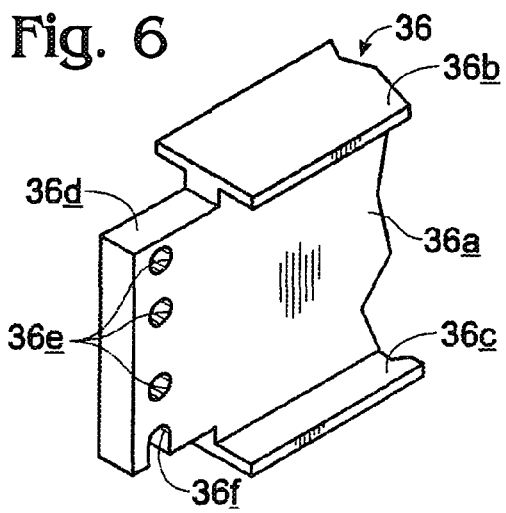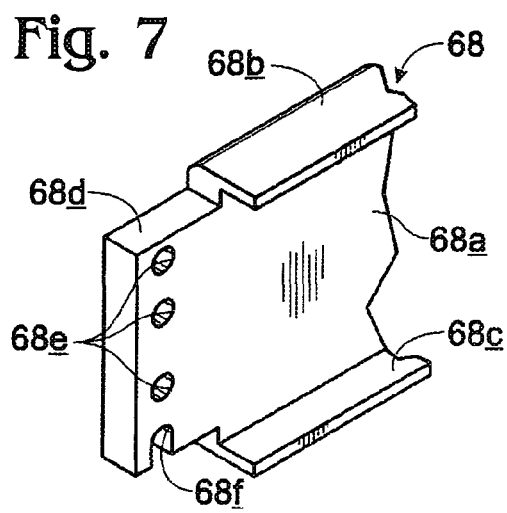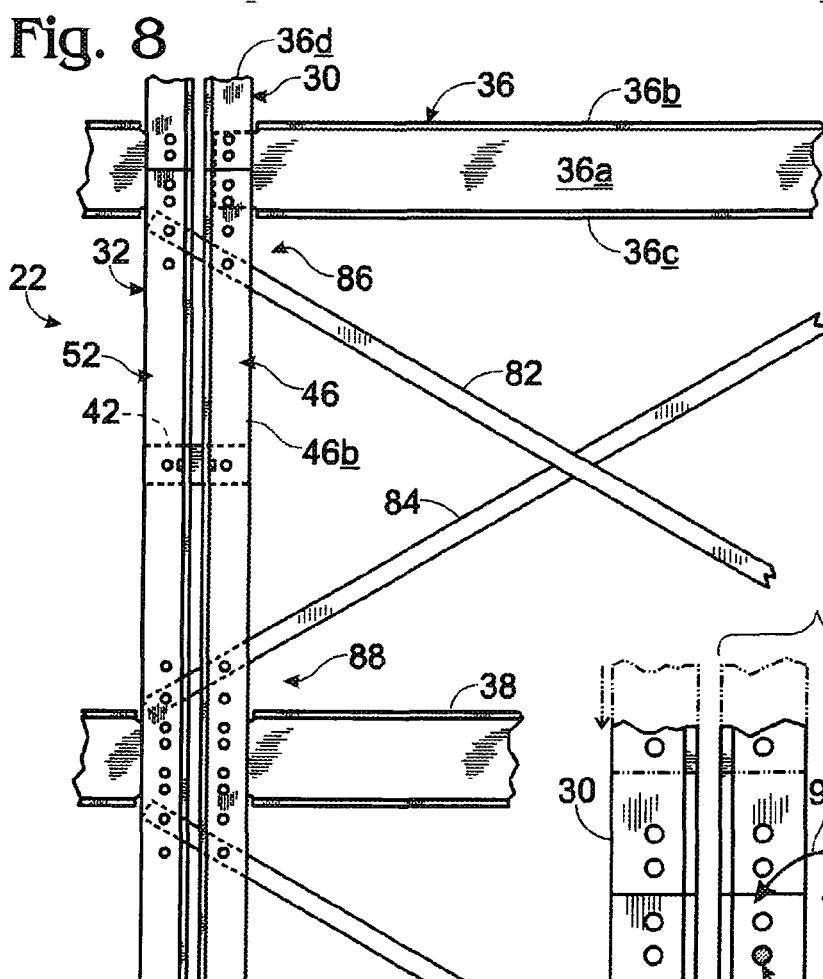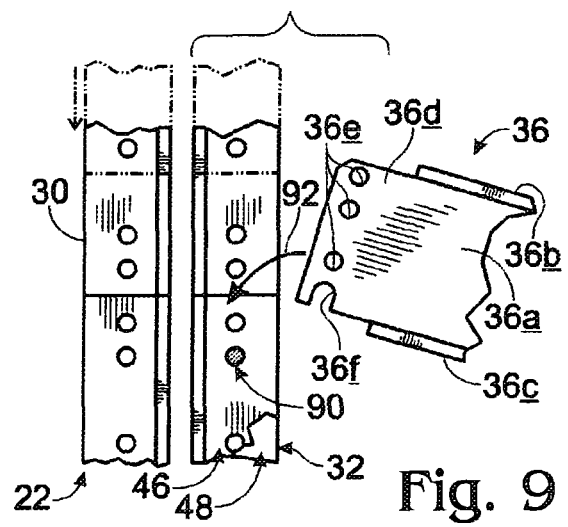

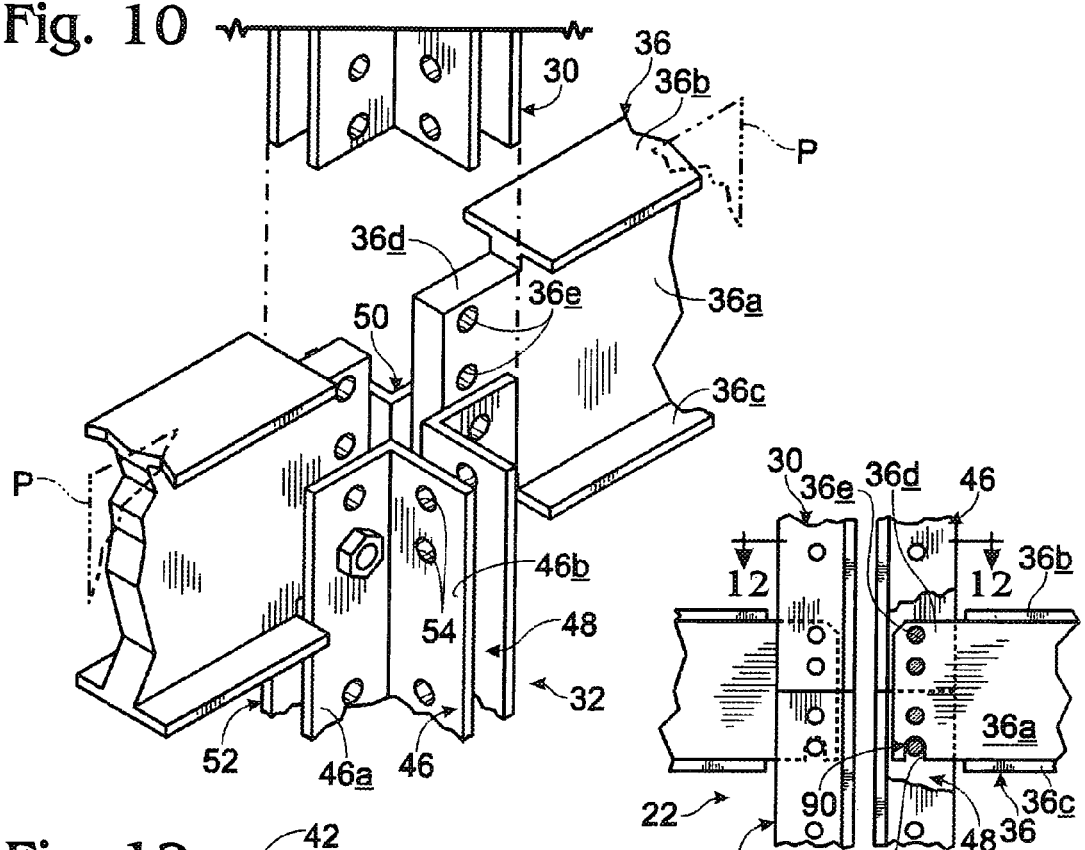
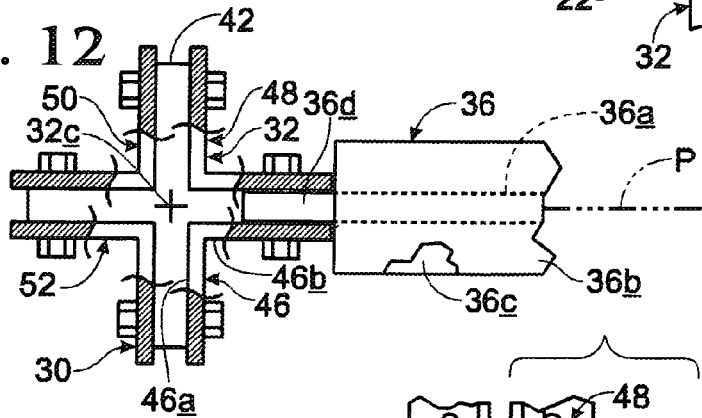
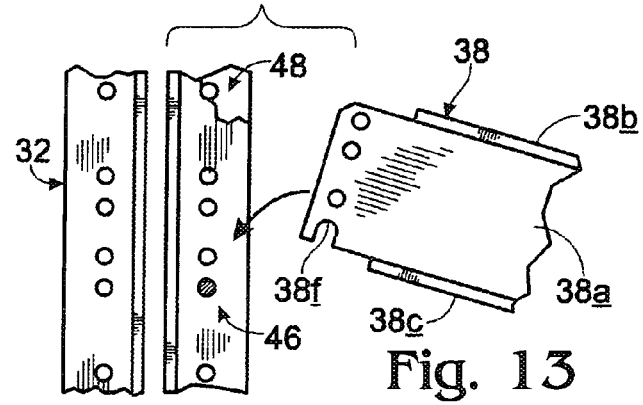

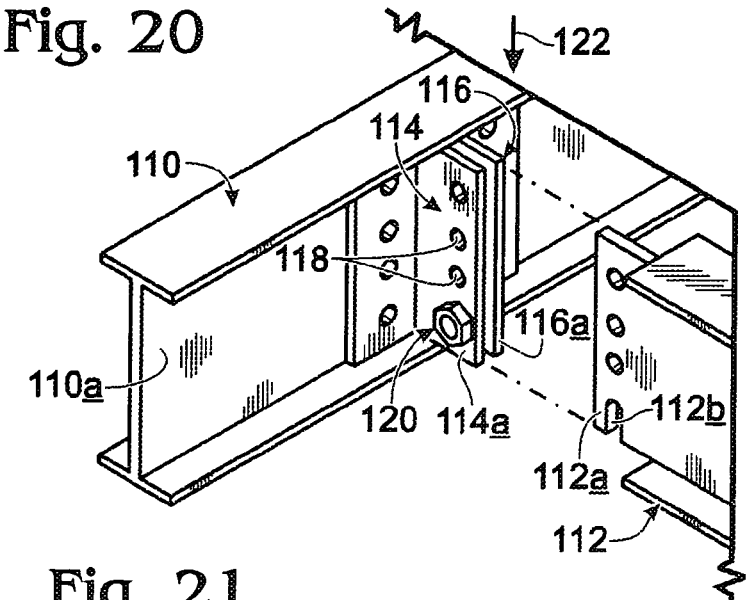
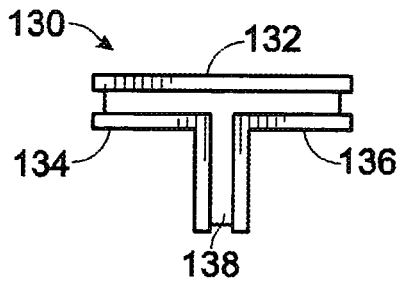
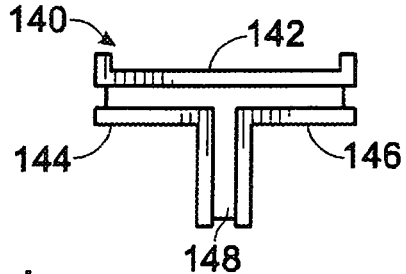
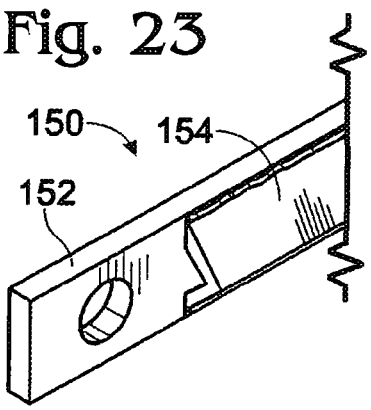
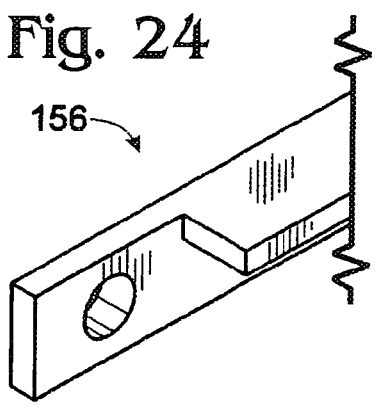
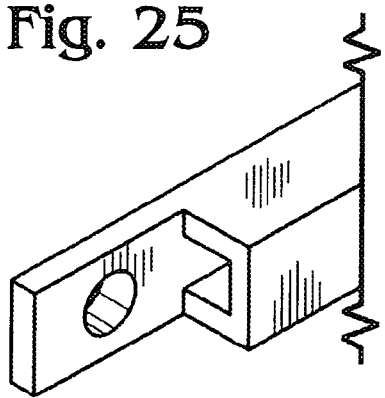

BUILDING FRAME STRUCTURE

CROSS REFERENCES TO RELATED APPLICATIONS

This application is a division of U.S. patent application Ser. No. 11/655,516, filed Jan. 18, 2007, for "A Method of Fabricating a Building Frame Structure", which is a division of U.S. patent application Ser. No. 10/961,886 (now abandoned), filed Oct. 9, 2004, for "Building Frame Structure", which is a continuation from U.S. patent application Ser. No. 10/102,404, filed Mar. 18, 2002, for "Building Frame Structure", now U.S. Pat. No. 6,802,169 B2, granted Oct. 12, 2004. The entire content of this patent and these three prior applications are hereby incorporated herein by reference.

BACKGROUND AND SUMMARY OF THE INVENTION

This invention pertains to building frame structure, and more particularly to a unique column-to-beam direct connection, and additionally to several unique column and beam interconnections, employable in such a frame structure. Several preferred embodiments of the invention are thus shown and described herein.

To clarify certain terminology which is employed herein, a "column/beam connection" is a single connection which exists adjacent one end of a beam, and between that beam end and a column. A "beam/beam connection" is a single connection which exists between the end of a beam and the side of a beam. A "column/column interconnection" refers to a pair of single "column/beam connections" (i.e., where a beam extends between and interconnects a pair of next-adjacent columns). A "column/beam interconnection" refers to an associated, single "column/beam connection", and a single "beam/beam connection" (i.e., where a beam extends between and interconnects a column and a beam). A "beam/beam interconnection" refers to a pair of single "beam/beam connections" (i.e., where a beam extends between and interconnects a pair of next-adjacent beams. A "beam cross-connection" refers to any one of a "column/column interconnection", a "column/beam interconnection", and a "beam/beam interconnection". Each beam cross-connection includes a single one of what is referred to herein as a cross-connection beam.

Proposed among other things for use in relation to the invention, although many different forms may be employed, is an elongate column structure which is formed from an assembly of plural, elongate, angle-iron-like components that are united by bolting them together through interposed spacers which help to define the final configuration of the column. In a specific column arrangement shown herein, four such angle-iron-like components are employed, with each of these taking the form, generally, of an elongate, right-angle, angle-iron section of otherwise conventional construction, and with cross-like spacers (one or more) interposed and holding these components apart. These four elongate components are arranged in such a fashion that their legs, also referred to herein as spaced flanges, and as spaced, parallel planar plate components, essentially radiate in a star-like manner from the long axis of the assembled column.

Each leg in each angle-iron-like component confrontingly faces one other leg in one adjacent such component.

These spaced, confronting, parallel planar legs, or plate components, play a role as anchor points in the practice and use of the present invention. For example, and as will be seen from a review of the drawings herein, these plate components enable the specially prepared ends of beams (extending central web portions of beams) to be inserted for attachment to columns in a manner which permits straight downward beam lowering (under the influence of gravity) without requiring a forced lateral separation or splaying of otherwise prepositioned, properly laterally spaced, substantially vertical columns to accommodate this activity. Hooks formed in the undersides of such extending beam-end web portions catch pre-installed cross-bolts, or cross-pins, which span a pair of spaced, confronting plate components, and such catching results in automatic establishment of a proper relative spatial relationship between the thus preliminarily interconnected building-frame elements.

The angle-iron-like components and the spacer, or spacers, in the column form shown herein and now being described, are screw-adjustable, nut-and-bolt connected to create a frictional interface between these elements. Depending upon the tightness employed in such connections, the level of frictional engagement can be adjusted, i.e., tighter for more frictional engagement, and looser for less. The assembled combination of angle-iron-like components and spacers forms a generally cross-shaped (transverse cross section) column assembly. Each column assembly is also referred to herein as a column structure, and as a column.

Given this type of column assembly, it will be apparent that there are spaces or recesses (a spatial relationship) provided in the regions between confronting legs (plate components) in an assembled column. In a building frame structure, these recesses, and their associated spatial relationships, are employed, as was just generally outlined above, to receive (i.e., to provide clearance for) modified and inserted end regions (or extensions) of the central webs in elongate I-beams. These same recesses, as illustrated herein, also receive the ends of cross-braces which each takes the form of flat metal bar stock. The end-modified I-beams result from removal of short portions of their upper and lower flanges to create central-web extensions.

Bolt holes, or openings, that are provided appropriately in the flanges in the angle-iron-like components in a column, and as well as in the end central-web extensions in a beam, are employed with nut-and-bolt cross-assemblies to complete an anchored connection between a column and a beam. In such a column/beam assembly (a connection), the column and beam directly engage one another through a frictional interface wherein the level of frictional engagement is nut-and-bolt adjustable.

With respect to such a column/beam connection, and providing now a further elaboration, the lower-most opening provided in an I-beam's web-end projection takes the form of an open-bottomed hook which, during quick, preliminary assembly of a frame structure, extends into the open, or recessed, region between flanges in a column. Under the influence of gravity, the downwardly exposed and facing hook catches and seats onto a preliminarily entered nut-and-bolt assembly, wherein the bolt's shank extends across and spans the space between a pair of flanges to act as a catch on which this hook can seat and become gravity-set. Such seating quickly introduces preliminary stabilization in a frame being assembled, and (as already mentioned) also acts to index the proper relative positions of columns and beams.

With this construction, and as can be seen in the drawings, an I-beam, importantly, can be lowered straight down under the influence of gravity into a proper seated position in a building frame. When so lowered, and as will also be seen, gravity seating of a beam in place produces precision and correct spatial alignment of the beam and of the frame components (plate components, columns and other beams) to which it is attached. This is an important feature of the present invention.

Following seating of a beam in a condition where, as will be seen from description provided later herein, a downwardly facing hook-like slot in the end of a beam web freely receives the shank of a cross-bolt (of a nut-and-bolt assembly) which has been attached to, and which spans, the two spaced plate components in a pair of these components, another cross nut-and-bolt assembly is installed to anchor the beam end in place.

As will further be seen, the invention features column/beam (outlined above) and beam/beam connections. In a beam/beam connection, the side of the central web in a beam is equipped with an attached pair of spaced, upright, parallel-planar plate components which extend laterally outwardly from the associated central web intermediate the opposite ends of the beam. These plate components furnish the same kind of vertical-motion-accommodating spatial clearance described above in relation to the mentioned angle-iron leg components (flanges). The prepared end of the central web in a beam is seated between such laterally extending plate components to establish an orthogonal relationship between two, thus-connected beams. With such an arrangement, vertical, or straight-down, lowering of a beam is employable conveniently to form such a beam/beam connection. Additionally, this structural arrangement, where two beam/beam connections are used collaboratively, enables vertical, or straight-down, lowering of a beam with its two, appropriately prepared ends, to interconnect, say, two, spaced, parallel, next-adjacent, horizontal beams which are already connected to columns. Such a beam/beam interconnection can be accomplished without there being any requirement for forced lateral separating of the two spaced, parallel beams in order to accommodate such a "cross-attachment" of and to another beam.

Modifications to the preferred form of the invention are recognized, and are possible in certain applications. For example, columns might be formed with three rather than four elongate components. With respect to a column having just three such components, the included angles between legs in these elements, progressing circularly about the column's long axis, might be 120°-120°-120°, 135°-135°-90°, or 180°-90°-90°. Illustrations of these arrangements, which are not exhaustive, are illustrated herein.

While different lengths of component-assembled columns can be made in accordance with the invention, such lengths being principally a matter of designer choice, two different column lengths are specifically shown and discussed herein. The principal one of these lengths characterizes a column having a length which is basically the height-dimension of two typical stories in a multi-story building. The other length characterizes a column having a length of approximately of one such story height. The individual columns are stacked end-for-end to create elongate upright column stacks that define an overall building-frame height.

According to one interesting feature of the frame structure shown herein, where two stacked columns abut end-to-end, this abutment exists essentially at the location of one of the floor heights intended in the final building. At this location, interestingly, a direct structural splice is created between such end-contacting, stacked columns, such a splice being established through the nut-and-bolt connected end extension of the central web in a beam. Thus, structural connections between beams and columns may act as connective splices or joints between adjacent, stacked columns. The amount of tightness introduced into the splice-related nut-and-bolt assemblies controls the level of frictional engagement present there between beam and column.

As will become apparent from the description in detail which follows below, taken along with the accompanying drawings, forces which are exerted and transmitted between columns and beams in a building structure formed in accordance with the present invention lie in upright planes which pass through the central longitudinal axes of the columns and beams. Accordingly, load management is, as is most desired, directed essentially centrally between adjacent connected components.

On a side note of interest, the nut-and-bolt, frictional-interface connections existing in the regions of interconnection between elongate column components and spacers, and between beams and columns, allow for limited relative sliding motions between these elements under certain load-handling circumstances. Such motions are believed to enhance the load-management capabilities of a building frame structure, and furnish a certain helpful amount of energy dissipation in the form of non-damaging heat.

The detailed description of the invention now given below, when read in conjunction with the accompanying drawings, will clearly bring out the special offerings and advantages of the several facets of the present invention.

BRIEF DESCRIPTION OF THE DRAWINGS

FIG. 1 is a schematic, stick-figure drawing illustrating portions of a building frame structure which has been constructed in accordance with the present invention.

FIG. 2 is an upper-end, fragmentary view of one column which is employed in the building frame structure of FIG. 1.

FIG. 3 is a top axial view of the same column pictured fragmentarily in FIG. 2.

FIGS. 4, 5A and 5B, inclusive, illustrate, in isolated manners, the assembled structure of a column spacer which is employed in the column of FIGS. 2 and 3, and of the individual components which make up this spacer.

FIG. 6 is a fragmentary, isometric view of a specifically configured I-beam which is employed according to the invention.

FIG. 7 is a fragmentary, isometric view of a specifically configured channel beam which also may be employed according to the invention.

FIG. 8 is a fragmentary drawing illustrating column/beam connections which exist between stacked columns and beams in the frame structure of FIG. 1, and between columns and diagonal cross-bracing.

FIG. 9 is a fragmentary detail illustrating a preliminary step in the assembly and splice-joining of a beam and a pair of stacked columns.

FIG. 10 is a larger-scale view illustrating, isometrically, roughly the same thing which is pictured in FIG. 9.

FIG. 11 is a view illustrating a completed bridging splicing connection between two beams and a pair of stacked columns.

FIG. 12 is a view taken generally along the line 12-12 in FIG. 11.

FIG. 13 presents a view which is very similar to that presented in FIG. 9, except that here what is shown is the connection between a beam and a column at a location vertically intermediate the ends of the column.

FIG. 20 illustrates fragmentarily a beam/beam connection end of a beam/beam inter-connection.

FIGS. 21 and 22 illustrate two different cross-sectional versions of modified forms of columns constructed in accordance with the invention.

FIGS. 23-25, inclusive, illustrate modified forms of cross-braces.

DETAILED DESCRIPTION OF THE INVENTION

Figure 14:
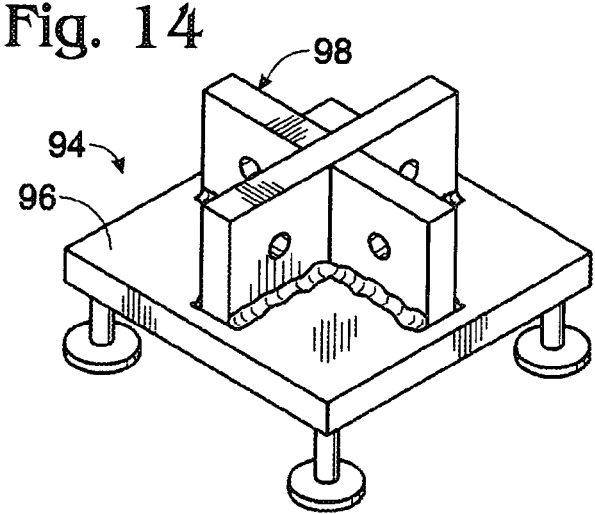
FIG. 14 is a view showing a base-plate structure which is employed at the lower ends of column stacks present in the building frame structure of FIG. 1.

Turning attention now to the drawings, and referring first of all to FIGS. 1-5B, inclusive, indicated generally at 21 in FIG. 1 is a fragmentary portion of a multi-story building frame structure which has been constructed in accordance with the present invention. In frame structure 21, four column stacks 22, 24, 26, 28 are shown, each of which is made up of a plurality of end-two-end, splice-joined elongate columns that are constructed in accordance with the present invention. The phrase "column stack" is employed herein to refer to such plural, end-connected columns, and the word "column" is employed herein to designate a single column assembly which has been built in accordance with the invention. In order to illustrate certain characteristic versatility which is furnished by the invention, two different types of columns—double-story and single-story—are shown in these column stacks.

Three columns in stack 22 are shown at 30, 32, 34. As will shortly be more fully explained, the upper end 32a of column 32 is joined to the lower end of column 30, and the lower end 32b of column 32 is joined to the upper end of column 34. Columns 30 (shown only fragmentarily) and 32 are two-story columns (see length L), and column 34 is a single-story column herein (see length l). One more column is specifically labeled at 35 in FIG. 1. This column is essentially the same in construction as column 32.

Extending to form a column/column interconnection between, and joined to, the columns in the several column stacks pictured in FIG. 1 are plural, horizontal beams, such as the three beams shown at 36, 38, 40. The distances between next-adjacent ones of these three beams are the same, and have the spacing of one story-height in frame structure 21. Beam 36 has its near end in FIG. 1 splice-connected (still to be explained) via a column/beam connection to column stack 22 at the region of end-to-end joinder between columns 30, 32. Via another column/beam connection, beam 38 has its near end in FIG. 1 connected vertically centrally between the opposite (upper and lower) ends of column 32. Beam 40 has its near end in FIG. 1 connected, also through a column/beam connection, to the region of end-to-end joinder between columns 32, 34. As will soon be explained, the manners in which the just-mentioned ends of beams 36, 40 are connected to columns in column stack 22 is somewhat different from the manner in which the near end of beam 38 in FIG. 1 is connected centrally between the upper and lower ends of column 32.

Presented in FIG. 1, as can be seen, are plural, large, black dots. These dots represent the locations of spacers, or spacer structures, which form parts in the various columns that are employed in frame structure 21. For example, shown at 42, 44 in FIG. 1 are two black dots (spacers) which form part of column 32. These two dots indicate the presence of spacers within column 32 at locations in structure 21 which are roughly midway between floors. Thus, dot 42 represents a spacer which is present in column 32 generally vertically centrally between beams 36, 38. Dot 44, and the spacer which it represents in column 32, resides generally vertically centrally between beams 38, 40. A black dot 45 represents a spacer which is present in single-story column 34, generally vertically centrally between the upper and lower ends of column 34. Clear, or open, circular dots in FIG. 1 represent the end-to-end connections between vertically adjacent columns in the respective column stacks.

FIGS. 2 and 3 illustrate somewhat more specifically the structure of column 32, and thus also, the structures of many other ones of the various columns employed in the column stacks pictured in FIG. 1. Column 32 herein is formed with four, elongate, angle-iron-like components 46, 48, 50, 52. These angle-iron-like components substantially parallel one another, and also parallel the central long axis 32c of column 32. Each of components 46, 48, 50, 52 has a right-angular cross-section formed by angularly intersecting legs, such as legs 46a, 46b in component 46. These legs meet at an elongate, linear corner, such as corner 46c. Corner 46c lies closely adjacent, and substantially parallel to, axis 32c. These legs are also referred to herein as spaced, parallel-planar plate components, and the space between them is referred to herein as a vertically accessible, open-topped, beam-web receiving zone.

As can be seen, column 32 has a generally cross-shaped transverse cross-sectional configuration, formed in such a fashion that the legs in the angle-iron-like components essentially radiate laterally outwardly (star-like) from axis 32c. Each leg in each angle-iron-like component is spaced from, confrontive with, and generally parallel to one leg in a next-adjacent angle-iron-like component.

As seen in FIG. 2, the upper end region 32a in column 32 is furnished with aligned through-bores, such as through-bores 54 which are provided in flange 46b. As will soon be explained, these through-bores are employed for the attachment of beams, such as beam 36, and for splicing joinder to the underside of an overhead column, such as column 30. Accordingly, through-bores 54 are also referred to herein as splice-accommodating structure.

Provided at the locations of previously mentioned black dots 42, 44 in FIG. 1 are cross-shaped, two-component spacers, such as spacer 42 which is variously shown in FIGS. 3-5B, inclusive. Spacer 42 is formed from two like-configured components, one of which is shown isolated at 42a in FIG. 5A, and other of which is shown isolated at 42b in FIG. 5B. These spacer components are centrally notched so that they can be fit together as shown in FIG. 4, and the outward extensions of components 42a, 42b are provided with through-bores, such as bores 56 shown in component 42b.

Spacer 42 is placed generally longitudinally centrally between beams 36, 38, and between the confronting legs of column components 46, 48, 50, 52. It is bolted there in place through appropriate nut-and-bolt assemblies, such as the assembly shown at 58 in FIG. 3, and through suitable accommodating through-bores (not shown) provided in the legs in components 46, 48, 50, 52. Spacer 44 is similarly positioned in column 32 vertically centrally between beams 38, 40. When in place, the spacers space apart the angle-iron-like components in the column with what can be thought of as the centerlines of these spacers aligned with previously mentioned column axis 32c. Preferably, the thickness of each of components 42a, 42b is about equal to the thickness of the central web portions of the beams which are employed in the building frame structure of FIG. 1.

In each column, the angle-iron-like components, the spacer, or spacers which hold these apart, and the nut-and-bolt assemblies (and related through-bores) which bind all together, are toleranced in such a manner, that there is present in the region associated with each spacer a friction interface. This interface can allow for a certain small amount of relative longitudinal motion (along the long axes of the columns) between these elements. The amount of tightness introduced into the nut-and-bolt assemblies dictates the level of frictional engagement, which is thus selectable and adjustable. The significance of this feature of the invention will be more fully discussed shortly.

An assembled column, like column 32, thus takes the form of an assembly of four, right-angle, angle-iron-like components disposed as described and illustrated relative to one another, and held together through nut-and-bolt assemblies which clamp the angle-iron-like components onto the spacers, such as spacers 42, 44. A consequence of this construction is that there are openings or recesses laterally outwardly facing along the length of column 32, defined, in part, by the spacings which exist between the confronting legs in the angle-iron-like components.

These recesses are employed herein to receive, as will below be described, the inserted extending end portions of the central webs in beams, such as beams 36, 38, 40.

Figure 15:
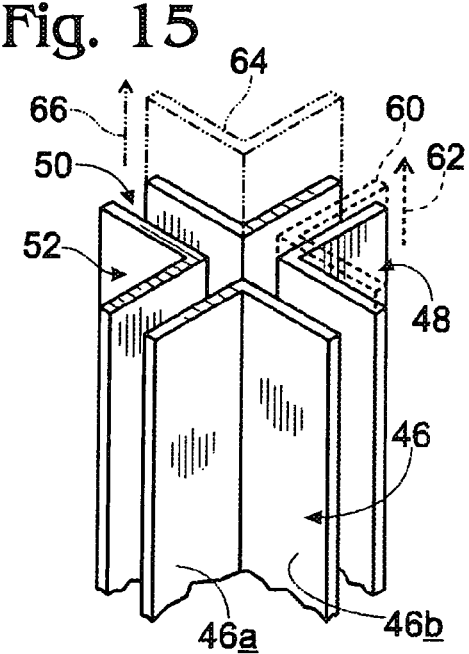
FIG. 15 is a fragmentary schematic view, somewhat like the view presented in FIG. 2, illustrating a feature of the invention which involves the capability of angle-iron-like components in a column to shift independently and longitudinally relative to one another, and also relative to a spacer (not shown) in this column.

Digressing for just a moment to FIG. 15, here, angle-iron-like components 46, 48, 50, 52 are represented fragmentarily as spaced elements. In FIG. 15, dashed lines 60, and a dashed arrow 62, show angle-iron-like component 48 slightly upwardly shifted from its solid outline position relative to the other three angle-iron-like components 46, 50, 52. Similarly, dash-double-dot lines 64, and dash-double-dot arrow 66, illustrate upward shifting of angle-iron-like component 50 relative to components 46, 48, 52. These moved positions for components 48, 50 are highly exaggerated in FIG. 15. This has been done to point out clearly a feature of the invention (mentioned earlier) which is that the tolerances that are built into the fastening regions between these angle-iron-like components and the spacers is such that, under severe loading conditions which produce bending of column 32, the angle-iron-like components therein can actually shift slightly relative to one another so as to act somewhat as independent elements. Such shifting also creates frictional, energy-dissipating braking action in the regions where these elements contact one another. This capability of a column built in accordance with the present invention offers a column which can act as a heat energy dissipater to absorb shock loads to a building frame.

Turning attention to now to FIGS. 6, 7, 18 and 19, and beginning with FIG. 6, here there is shown fragmentarily at 36 an end region of previously mentioned beam 36. Beam 36 includes a central web 36a, and upper and lower flanges 36b, 36c, respectively. As can be seen, short portions of the end regions of flanges 36b, 36c, have been removed to create and expose what is referred herein as an extension 36d in and from central web 36a.

Provided in extension 36d are three vertically spaced through-bores 36e, and a downwardly facing through-bore-like hook 36f. How this modified form of an otherwise conventional I-beam functions in the setting of the present invention will be described shortly.

FIG. 7 illustrates at 68 an alternative beam construction contemplated for use in and with respect to the present invention. Beam 68 has been formed from an otherwise conventional channel member having a central web 68a, and upper and lower flanges 68b, 68c, respectively. End portions of the upper and lower flanges have been removed as shown to create and expose an extension 68d from central web 68a. Extension 68d, like previously mentioned beam extension 36d in FIG. 6, includes three through-bores 68e, and a through-bore-like hook 68f. It will become very apparent shortly, without further direct discussion, how channel beam 68 can be used alternately with I-beam structure 36.

Figure 18:
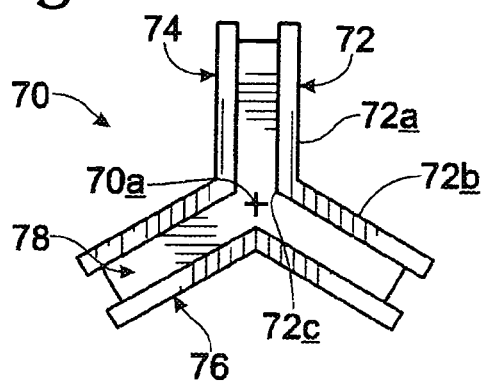
FIGS. 18 and 19 are somewhat like FIG. 3, except that here what are shown are two different modified forms of an assembled, star-like cross-section column built in accordance with the present invention.
Figure 19:
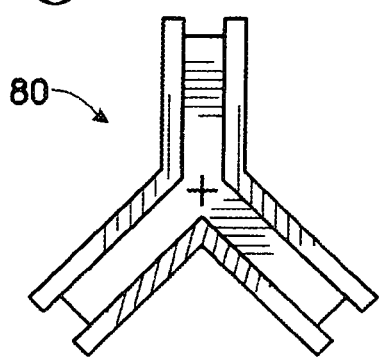

FIGS. 18 and 19 illustrate modified forms of star-like-cross-section column construction contemplated by the present invention. In FIG. 18 there is shown a column 70 which has a kind of three-sided configuration formed by angle-iron-like components 72, 74, 76. Components 72, 74, 76 include paired, angularly intersecting, elongate legs, such as legs 72a, 72b, which meet at an elongate linear corner, such as corner 72c that substantially parallels and is slightly spaced from the long axis 70a of column 70. In the particular configuration shown in FIG. 18, the included angle in each of the three angle-iron-like components between the paired legs therein is about 120-degrees.

Suitable spacer structures, like that shown at 78, act between components 72, 74, 76 in column 70 in much the same manner that a spacer, like spacer 42, acts between column components, such as components 46, 48, 50, 52 previously discussed. Joinder between spacer structures and angle-iron-like components is also similar to that previously described with respect to column 32.

In FIG. 19, there is shown generally at 80 yet another column structure which has a kind of three-way configuration somewhat like that pictured for column 70 in FIG. 18. In order to simplify matters herein, the same set of reference numerals employed for the several components pictured in FIG. 18 for column 70 are also employed in similar locations and for similar components in column 80 in FIG. 19. The principal difference between column 80 and column 70 is that, in column 80, the angularly intersecting legs in two of the angle-iron-like components possess an included angle of about 135-degrees, and the third angle-iron-like component has legs possessing an included angle of about 90-degrees.

Shifting attention now to FIGS. 8-12, inclusive, FIG. 8 illustrates, in much greater detail, that region within building structure 21 which includes columns 30, 32 and beams 36, 38. In this figure, the columns and beams shown are fully assembled with respect to one another, with end region 36d in beam 36 generating an end-two-end splice between the adjacent ends of columns 30, 32, and with the end region in beam 38 joined through nut-and-bolt assemblies to a region in column 32 which is generally longitudinally centrally between its opposite ends. One should recall that column 32 has a length which essentially spans the dimension of two stories in frame structure 21. As can generally be seen in FIG. 8, a nut-and-bolt pattern which involves four nut-and-bolt assemblies is employed at the region of joinder between columns 30, 32 and beam 36. In the region of joinder between column 32 and beam 38, where no splice occurs between columns, the end of beam 36 is attached to legs in column components 46, 48 also utilizing a four nut-and-bolt pattern of nut-and-bolt assemblies. Thus, the attached end region in beam 36 includes three through-bores and a downwardly facing hook. Similarly the end region in beam 38 includes three through-bores and also a downwardly facing hook.

Also pictured in FIG. 8 is cross-bracing structure including a pair of bar-stock-configured cross-braces 82, 84. These two cross-braces span the rectangular area which is bounded by beams 36, 38, and by columns 32, 35. The ends of the cross braces extend through and between the spaces/recesses provided between the legs in the angle-iron-like components, and are suitably anchored there as by nut-and-bolt assemblies generally located at the regions in FIG. 8 shown at 86, 88. Cross-braces 82, 84 essentially lie in a common plane shared with the long axes of beam 36, 38, as well as with the long axis of column 32.

FIG. 9 illustrates the conditions of various components just prior to inter-connection of beam 36 with columns 30, 32. In solid lines in FIG. 9 the upper end of column 32 is prepared preliminarily with the presence of a nut-and-bolt assembly 90 wherein the shank (also referred to as a spanning device) of the bolt extends through the lower-most ones of the through-bores provided in angle-iron-like components 46, 48, thus spanning completely between these two components. Column 30 does not yet occupy its solid outline position in FIG. 9, but rather may be poised and spaced upwardly in the dash-dot outline position pictured in FIG. 9.

The end of beam 36 which includes central-web extension 36*d* is advanced toward the recess between angle-iron-like components 46, 48, and, according to one manner of placement, or seating, is introduced by gravity into proper position as illustrated by curved arrow 92. This involves insertion of extension 36*d* between components 46, 48, and hooking, employing gravity, hook 36*f* onto the shank of the bolt in nut-and-bolt assembly 90.

According to another manner of placement, beam 36 can be lowered under the influence of gravity straight down into place as indicated by arrow 91. It will be understood that the "arrow-91" manner of beam seating, with both ends of beam 36 prepared with the configuration illustrated in FIG. 9 for one end of this beam, will cause both ends of the beam to seat substantially simultaneously in place. When a beam becomes seated in either of the ways just described, such seating effectively results in the specific interconnected beam and column components coming into correct, precision spatial disposition in a building frame.

Beam 36 is then oriented so that its long axis is substantially orthogonal with respect to the long axis of column 32, and column 30 is lowered toward and into its solid outline position in FIG. 9. When this has taken place, appropriate line-up occurs between the through-bores provided in beam extension 36*d*, in the upper end of column 32, and in the lower end of column 30, so as to permit the insertion and tightening of nut-and-bolt assemblies with respect to the other illustrated through-bores.

This results in a completed assembly between columns 30, 32 and beam 36 in a condition where web extension 36*d* in beam 36 creates a splice between the adjacent ends of columns 30, 32. This condition is clearly shown in FIGS. 11 and 12. FIG. 10 is also helpful in illustrating this condition, with this figure picturing the conditions of components just before lowering of overhead column 30 downwardly onto the upper end of column 32. The various nut-and-bolt assemblies so employed to create a splicing interconnection between beam 36 and columns 30, 32 are appropriately tightened to establish the desired level of frictional interengagement which exists directly between the confronting surfaces of beam 36 and columns 30, 32.

FIG. 13, which is similar to FIG. 9, illustrates somewhat the same processes of interconnection which may take place between beam 38 and the vertical mid-region of column 32. An arrow 93 in FIG. 13 shows this. Slightly curved-motion interconnection is shown by a curved arrow 95 (which is like curved arrow 92 in FIG. 9). Straight down vertical seating is shown by an arrow 93.

Completing now a description of things shown in the various drawing figures, FIG. 14 pictures at 94 a base-plate structure which is employed in frame structure 21 adjacent the bases of the different column stacks, such as column stack 22. These base-plate structures effectively tie the stacks to the foundation (not specifically shown). Base-plate structure 94 includes a generally horizontal plate 96, on the upper surface of which there is welded a cross-structure 98. This cross-structure is essentially a replica of a spacer structure like that described for spacer 42. The cross-structure receives the lower end of the lower-most column in stack 22, with the confronting spaced legs of that column, at its lower end, receiving the cross-structure. Appropriate nut-and-bolt assemblies (not shown) anchor things in place at this base-plate structure.

Figure 16:
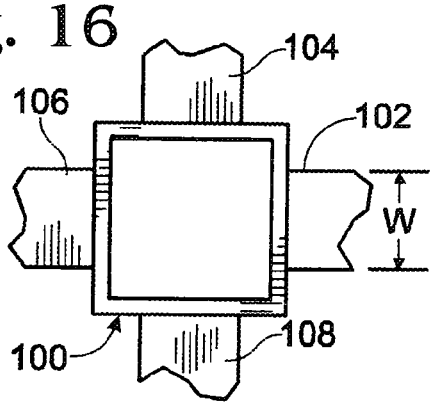
FIGS. 16 and 17 are views which compare how a conventional rectangular tube-shaped column, and a cross-shaped column constructed in accordance with the present invention, differently accommodate the attachments thereto of internal wall structure in a building.
Figure 17:
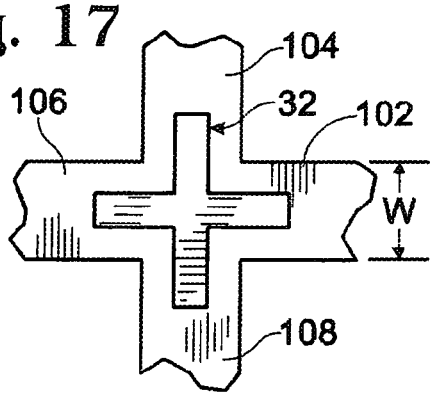

FIGS. 16 and 17 illustrate very schematically yet another facet of the present invention. Specifically what is shown in a comparative manner in these two figures is the difference which exists with respect to walls (having a thickness W) brought together at a corner within a building under circumstances with a conventional rectangular tube-like column (FIG. 16) employed, and with a cross-shaped column (FIG. 17) provided in accordance with the present invention.

In FIG. 16, a conventional, hollow, rectangular, square-cross-section column 100 is pictured along with four interior walls structures 102, 104, 106, 108. What one will here notice is that, if wall structures having generally the wall thicknesses pictured in FIG. 17 are employed, the corners of column 100 protrude and are exposed. In order not to have these corners protrude, the wall thicknesses would have to be larger, and larger wall thicknesses translates into lesser usable floor space in a finished building.

As can be seen in FIG. 17, where the cross-sectional transverse perimeter outline of column 32 is illustrated, these same wall structures 102, 104, 106, 108 come together in a manner where the corners are not broken by the protrusion of any part of column 32.

In FIG. 20 a beam/beam inter-connection (one end beam/beam connection only being shown, though two are, of course, simultaneously involved), also referred to herein as a beam cross-connection, is illustrated fragmentarily. The single-end beam/beam connection (one of the mentioned two) specifically shown in FIG. 20 is one existing between a pair of orthogonally related beams 110, 112 which may form a part of the frame structure pictured at 21 in FIG. 1. Very specifically, a longitudinal central region in beam 110 has attached (by bolting) to opposite sides of its central web 110*a* two pairs of right-angle brackets (or parallel-planar, spaced plate components), such as the pair containing brackets 114, 116. Brackets 114, 116 include spaced, parallel confronting legs 114*a*, 116*a*, respectively, which are spaced apart (in the illustration now being described) with essentially the same spacing provided for the legs in previously discussed angle-iron-like components 46, 48, 50, 52.

A four through-bore pattern, including bores such as the two shown at 118, is provided in legs 114*a*, 116*a*. A nut-and-bolt assembly 120 is fitted into the lower-most opposing through-bores, with the shank of the bolt spanning the space between legs 114*a*, 116*a*.

The fragmentally visible but yet unattached, end of beam 112 is prepared with a matchingly through-bore central web extension 112*a*, wherein the lower-most through-bore is actually a hook 112b which is like previously mentioned hook 36f. Full attachment of beams 110, 112 is accomplished in somewhat the same manner described above for column-beam attachment (see vertical arrow 122 in FIG. 20).

FIG. 21 illustrates the cross section of a modified column 130 which, for elongate components, includes a flat plate 132, and two right-angle angle-iron-like elements 134, 136. One spacer structure associated with these elements is shown at 138.

FIG. 22 illustrates at 140 another modified-cross-section column including a channel member 142, and two right-angle angle-iron-like components 144, 146. A spacer for these components is shown at 148.

FIG. 23 shows a modified cross-brace construction 150 which is made up of the welded combination of a flat plate 152 and an angle iron 154.

FIG. 24 shows at 156 another modified form of a cross-brace, which here takes the shape of a conventional right-angle angle iron.

FIG. 25 shows at 158 still another modified cross-brace form which has a rectilinear, tubular configuration.

The special features of the present invention are thus fully illustrated and described. More specifically, fully illustrated and described herein is a unique beam cross-connection establishable variously between columns and beams, each such cross-connection employing, in pairs, different combinations of what have been referred to herein as beam/beam and column/beam connections. Variations and modifications are of course recognizably possible which will come within the spirit of the invention.

I claim:

1. A structural, I-beam cross-connection between a pair of spaced, nominally in-place, previously installed building-frame elements having facially confronting sides, each of which elements may be either one of an in-place column or an in-place beam, said I-beam cross-connection comprising for each one in a pair of the mentioned building-frame elements, (a) a pair of parallel-spaced, upright, planar plate components operatively associated with the elements' respective facially confronting sides, which said plate components are spaced apart in a manner creating an upright, generally planar, straight-down vertically accessible, open-topped beam-web receiving zone having a lateral width which is substantially equal to the thickness of a cross-connection I-beam's central web, and which, therefore, is suitable for freely, and directly contactively frictionally, receiving the thickness of said cross-connection I-beam's central web, said web when received in the receiving zone associated with the spaced plate components, directly engaging each of said spaced plate components, and (b) a spanning device extending between said plate components at a location which is below the open top of said receiving zone, an elongate, generally horizontal, structural, cross-connection I-beam comprising said cross-connection I-beam's central web, said cross-connection I-beam's central web including a generally upright, planar, central web with opposite, specially prepared ends (a) vertically cleared of flanges, in the sense that, at each said specially prepared end, like portions of the cross-connection I-beam's upper and lower flanges have been removed to establish, at each said specially prepared end, a flange-free web end extension which extends beyond remaining, non-removed portions of the flanges, whereby each said web end extension is vertically, completely clear so as to permit downward insertion of it freely into said receiving zone and through the open top of that zone, with each inserted web end extension being free to be adjusted vertically, and directly contactively frictionally, within, and engaged with the opposite sides of, the receiving zone without any flange interference, and (b) having, on a lower margin of at least one of said prepared ends, a downwardly facing hook designed to catch and seat downwardly by gravity against said spanning device associated with at least one of the building frame elements, said hook being fully homogenous, integrated, and unitary in the central cross-connection I-beam's web, nut-and-bolt, screw-adjustable anchoring structure, in operative condition adjustably frictionally anchoring each web end extension to a pair of said plate components in said receiving zone existing between them, and an established structural relationship in such a building frame associated with (1) the cross-connection I-beam, (2) the mentioned pair of building-frame elements, (3) the paired plate components associated with each pair of building-frame elements, (4) the specially prepared cross-connection I-beam ends, (5) the hook, and (6) the spanning device, which relationship is characterized by (a) structural accommodation of vertical-motion clearance-placement of said web ends directly contactively frictionally between and with said paired components, and (b) automatic interconnection-establishment by such placement of a correct, relative, spatial, three-dimensional relationship and disposition of the cross-connected structural I-beam and building-frame elements.

2. A column/column, structural cross-connection I-beam interconnection in a building frame comprising for each one in a pair of next-adjacent, laterally spaced, nominally in-place columns, (a) a pair of parallel-spaced, upright, planar plate components operatively associated with a side of the column, which said plate components are spaced apart in a manner creating an upright, generally planar, straight-down vertically accessible, open-topped beam-web receiving zone having a lateral width which is substantially equal to the thickness of a cross-connection I-beam's central web, and which, therefore, is suitable for freely, and directly contactively frictionally, receiving the thickness of said cross-connection I-beam's central web, said web when received in the receiving zone associated with the spaced plate components, directly engaging each of said spaced plate components, and (b) a spanning device extending between said plate components at a location which is below the open top of said receiving zone, an elongate, generally horizontal, structural, cross-connection I-beam comprising said cross-connection I-beam's central web, said cross-connection I-beam's central web including a generally upright, planar central web with opposite, specially prepared ends (a) vertically cleared of flanges, in the sense that, at each said specially prepared end, like portions of the cross-connection I-beam's upper and lower flanges have been removed to establish, at each said specially prepared end, a flange-free web end extension which extends beyond remaining, non-removed portions of the flanges, whereby each said web end extension is vertically, completely clear so as to permit downward insertion of it freely, and directly contactively frictionally, into said receiving zone and through the open top of that zone, with each inserted web end extension being free to be adjusted vertically, and directly contactively frictionally, within, and engaged with the opposite sides of, the receiving zone without any flange interference, and (b) having, on a lower margin of at least one of said prepared ends, a downwardly facing hook designed to catch and seat downwardly by gravity against said spanning device associated with at least one of the columns, said hook being fully homogenous, integrated, and unitary in the central cross-connection I-beam's web, nut-and-bolt, screw-adjustable anchoring structure, in operative condition adjustably frictionally anchoring each web end extension to a pair of said plate components in said receiving zone existing between them, and an established structural relationship in such a building frame associated with (1) the cross-connection I-beam, (2) the columns, (3) the paired plate components associated with each pair of columns, (4) the specially prepared cross-connection I-beam ends, (5) the hook, and (6) the spanning device, which relationship is characterized by (a) structural accommodation of vertical-motion clearance-placement of said web ends directly contactively frictionally between and with said paired components, and (b) automatic, interconnection-establishment thereby of a correct, relative, spatial, three-dimensional relationship and disposition of the interconnected cross-connection structural I-beam and columns.

3. A beam/beam, structural, cross-connection I-beam interconnection in a building frame comprising for each one in a pair of next-adjacent, laterally spaced, nominally in-place I-beams, (a) a pair of parallel-spaced, upright, planar plate components operatively associated with facially confronting sides of these in-place beams, which said plate components are spaced apart in a manner creating an upright, generally planar, straight-down vertically accessible, open-topped beam-web receiving zone having a lateral width which is substantially equal to the thickness of a cross-connection I-beam's central web, and which, therefore, is suitable for freely, and directly contactively frictionally, receiving the thickness of said cross-connection I-beam's central web, said web when received in the receiving zone associated with the spaced plate components, directly engaging each of said spaced plate components, and (b) a spanning device extending between said plate components at a location which is below the open top of said receiving zone, an elongate, generally horizontal, structural, cross-connection I-beam comprising said cross-connection I-beam's central web, said cross-connection I-beam's central web including a generally upright, planar central web with opposite, specially prepared ends (a) vertically cleared of flanges, in the sense that, at each said specially prepared end, like portions of the cross-connection I-beam's upper and lower flanges have been removed to establish, at each said specially prepared end, a flange-free web end extension which extends beyond remaining, non-removed portions of the flanges, whereby each said web end extension is vertically, completely clear so as to permit downward insertion of it freely, and directly contactively frictionally, into said receiving zone and through the open top of that zone, with each inserted web end extension being free to be adjusted vertically, and directly contactively frictionally, within, and engaged with the opposite sides of, the receiving zone without any flange interference, and (b) having, on a lower margin of at least one of said prepared ends, a downwardly facing hook designed to catch and seat downwardly by gravity against said spanning device associated with at least of one of said laterally spaced, in-place I-beams, said hook being fully homogenous, integrated, and unitary in the central cross-connection I-beam's web, nut-and-bolt, screw-adjustable anchoring structure, in operative condition adjustably frictionally anchoring each web end extension to a pair of said plate components in said receiving zone existing between them, and an established structural relationship in such a building frame associated with (1) the cross-connection I-beam, (2) the laterally spaced, in-place beams, (3) the plate components associated with each of said laterally spaced, in-place beams, (4) the specially prepared cross-connection I-beam ends, (5) the hook, and (6) the spanning device, which relationship is characterized by (a) structural accommodation of vertical-motion clearance-placement of said web ends in said cross-connection beam directly contactively frictionally between and with said paired plate components, and (b) automatic, interconnection-establishment thereby of a correct, relative, spatial, three-dimensional relationship and disposition of the interconnected laterally spaced, in-place I-beams.

* * * * *